Feb. 22, 1966 K. H. BUCHHOLZ 3,236,495
BALL VALVE
Filed March 25, 1963 2 Sheets-Sheet 1
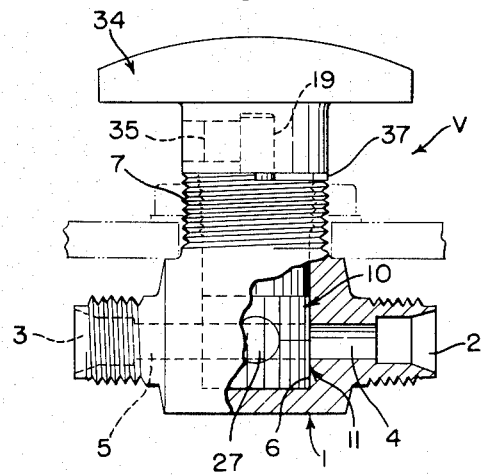
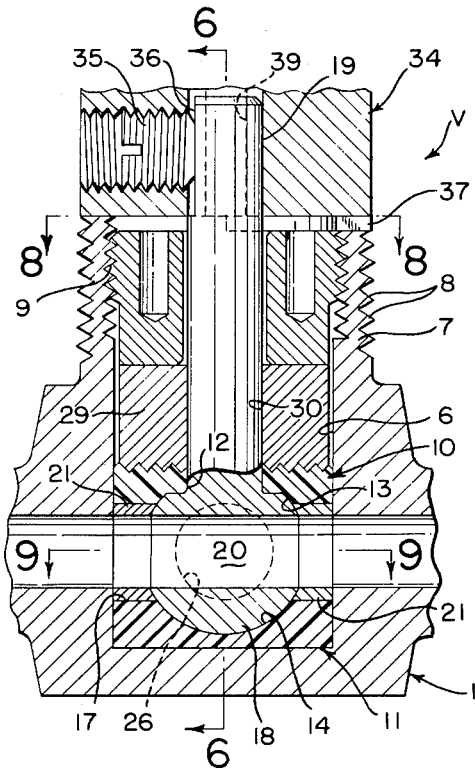
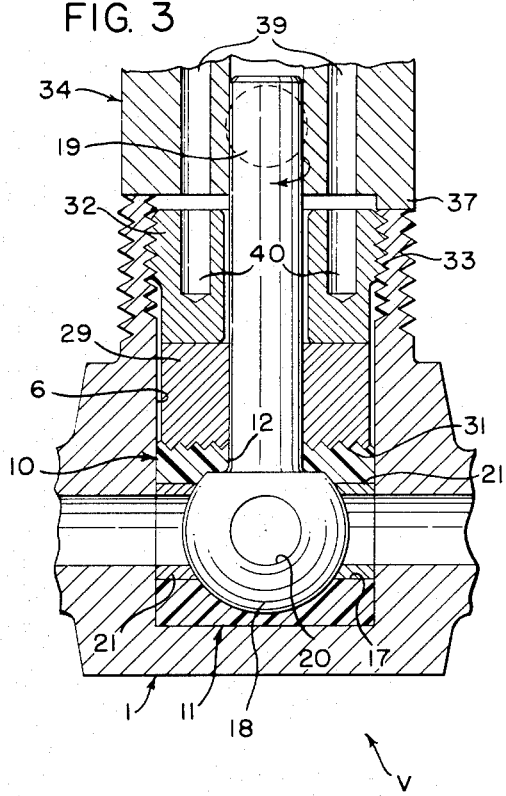
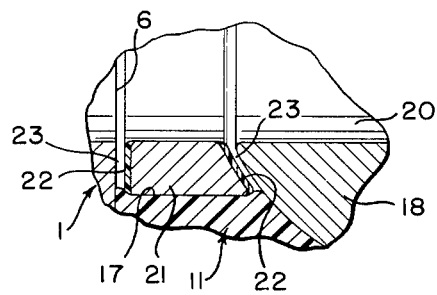
INVENTOR.
KURT H. BUCHHOLZ
BY
*Fay & Fay*
ATTORNEYS

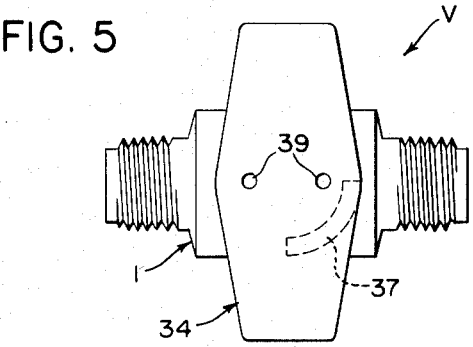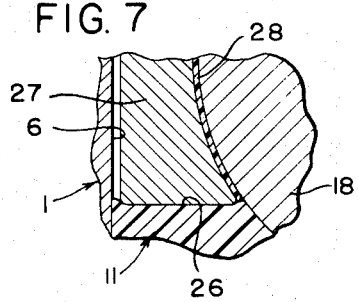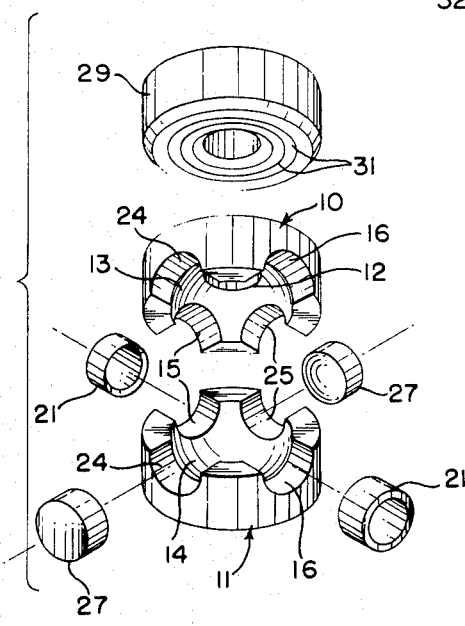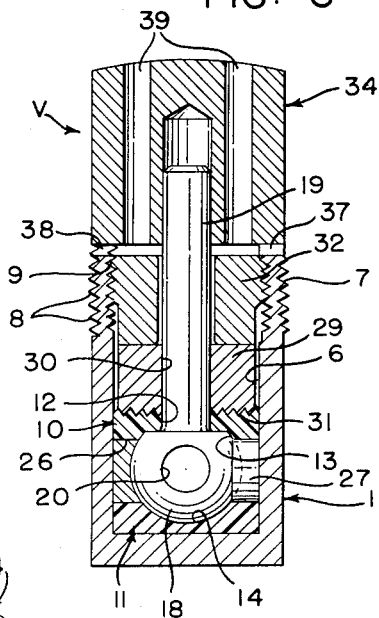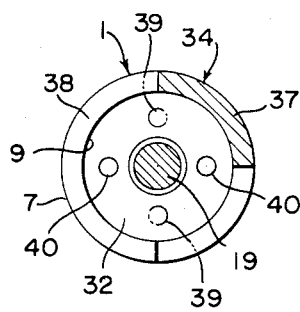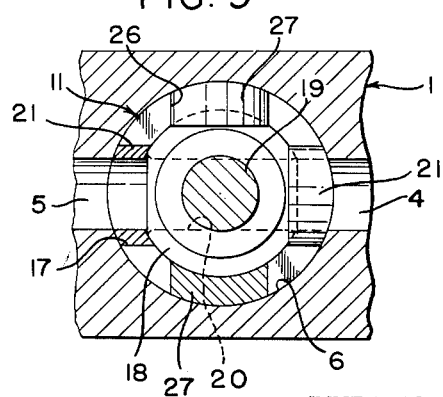

United States Patent Office 3,236,495
Patented Feb. 22, 1966

3,236,495
BALL VALVE
Kurt H. Buchholz, El Cerrito, Calif., assignor to Whitey Research Tool Co., Oakland, Calif., a corporation of California
Filed Mar. 25, 1963, Ser. No. 267,698
7 Claims. (Cl. 251—171)

This invention relates generally to valves, and more particularly to an improved ball valve of the type having a rotatable apertured ball enclosed in a valve housing with the valve housing containing sealing inserts cooperable with the rotatable ball to provide a leak tight seal.

In its broadest aspect, the instant invention is directed to an improved valve housing including the ball receiving cavity in the housing and an adjustable means of sealing the valve.

Ball valves of the type herein disclosed are designed for on-off application, as opposed to metering or throttling action. It is desirable, therefore, that the pressure drop through the valve be negligible in the "on" position and that the seals be leak proof over a prolonged period in the "off" position of the valve. Also, in order to maximize the utilization of the valve, it is desirable that the seals be effective over a wide range of pressures, including a vacuum.

The prior art ball valve constructions have raised several problems. One such problem pertains to the seals for the valve. The prior art typically has used separate seals at the inlet and outlet ports of the valve, with the seals being of a resilient material and having surfaces mating closely with those of the ball. When the valve is turned to an "off" position, the non-apertured surface of the ball is presented to the inlet side of the valve. The fluid pressure at the inlet acting on this surface of the ball forces the ball off center and against the outlet seal, with the inlet seal thereby being rendered ineffective. The problems arising from such a situation are two-fold. The degree of sealing at the outlet port becomes a function of the pressure exerted on the inlet surface of the ball. Also, the ball, being displaced from its central seat, is pressed against the outlet seal with considerable friction so that it becomes exceedingly difficult to turn the valve from the "off" to the "on" position.

A further problem resides in the fact that most valves are designed for operation over a relatively narrow range of pressures so that any particular valve has had limited application. The reason for this has been that the seals in the prior art valves were designed with a compromise in mind. Thus, it was known that greater sealing capacity was required at higher pressures, but it was also known that for a given size of valve the valve became stiff to operate due to the close fitting relationships of the parts required at higher pressures. The product has been a conscious compromise between pressure capacity and freedom of operation and a resultant limitation on the breadth of applicability.

Another problem attributable to the seals of the prior art ball valves has been the tendency of the seals to bulge or creep into the port of the ball, thereby hindering or even preventing further operation of the valve.

Valves of the prior art also have been characterized by a tendency to trap fluids or foreign particles in cavities existing in the valve housing.

With the above problems in mind, it is an object of this invention to provide a valve that is operable over a wide range of pressures.

It is a further object of the invention to provide a valve that includes sealing means that are effective over a wide range of pressures.

It is a still further object of the invention to provide means whereby the pressure on the seals may be adjusted without removing the valve from the line.

It is another object of the invention to provide a valve having an internal cavity free from irregularities which might entrap the fluid used in the system.

It is another object of the invention to provide means preventing the creeping or bulging of the seals into the aperture of the ball when the valve is in an "off" position.

Other and more complete objects will become apparent upon a reading of the description which follows.

The objects set forth are accomplished by a valve which includes a body machined from a single piece of bar stock. A unitary apertured ball and stem are disposed in a cavity in the valve housing with a synthetic resin capsule enclosing the ball. The capsule comprises a cylinder having two intersecting passages therethrough with a spherical cavity adapted to receive the ball at the intersection of the passages. Rings are placed at either end of one of the passages through the capsule so that fluid may flow through the capsule and the aperture of the ball. Solid disks are placed at either end of the other passage through the capsule to prevent the resinous material from creeping into the aperture in the ball when the aperture is aligned therewith.

A packing adjustment is provided in the form of a packing nut threaded in the bonnet of the valve and having two holes therein. The handle is secured by a set screw to the stem of the ball and likewise contains two holes which may be aligned with the holes in the packing nut. By this arrangement, with appropriate means such as a tool extending through the holes in the handle into the holes of the packing nut, the handle may be used as a wrench to tighten the packing nut and thereby adjust the pressure on the seals without disturbing the setting of the valve.

Other advantages and aspects of the invention will become more apparent upon a complete perusal of the specification and drawings, wherein:

FIG. 1 is a side elevation of the valve partially broken away showing the valve in open position;

FIG. 2 is an enlarged fragmentary section of FIG. 1;

FIG. 3 is a view similar to FIG. 2 showing the closed position;

FIG. 4 is a further enlarged fragmentary view of FIG. 2;

FIG. 5 is a plan view of FIG. 3;

FIG. 6 is a section on line 6—6 of FIG. 2;

FIG. 7 is an enlarged fragmentary view of FIG. 6;

FIG. 8 is a section on line 8—8 of FIG. 2;

FIG. 9 is a section on line 9—9 of FIG. 2; and

FIG. 10 is an exploded perspective view of the ball enclosing capsule.

The illustrated and preferred embodiment, the reference "V" indicates the valve assembly, which, as shown in FIG. 1, may be panel mounted. Valve body 1 is machined from a single piece of bar stock, thereby eliminating any joints or sealing points. The body includes ports 2 and 3 which are adapted to be connected to a fluid carrying line. The ports 2 and 3 communicate by passages 4 and 5, with a central chamber 6. The central chamber 6 is a smooth bore which extends vertically below the passages 4 and 5 and opens out through the bonnet 7 of the valve housing. Threads 8 are provided externally on the bonnet 7 as a means of facilitating the mounting of the valve in a panel, if it is so desired. Threads 9 are provided in the portion of the bore 6 which extends up into the bonnet 7 for a purpose which will be later disclosed.

Disposed in the central chamber 6 is a cylindrical retainer capsule or cage comprising upper and lower halves 10 and 11. The capsule is composed of a synthetic resin, such as polytetrafluoroethylene. The two halves 10 and 11 are of identical construction except for the addition of a bore 12 disposed centrally of the upper half 10. The opposing ends of the halves 10 and 11 are semi-spherically recessed at 13 and 14 so as to define jointly a spherical cavity therebetween. The halves 10 and 11 also have mating semi-circular recesses 15 and 16 which jointly define apertures or ports 17 communicating with the spherical cavity. The arrangement of the apertures are such that when the capsule is inserted in the cavity 6 the aperture 17 forms a passageway in alignment with the passageways 4 and 5 and thereby allows the flow of fluid through the capsule.

Rotatably received in the spherical cavity of the cylindrical capsule is a spherical ball member 18 having a stem 19 projecting from its periphery and extending upwardly through the opening 12 in the upper half 10. A bore or passageway 20 is provided in the ball 18 with the axis of the bore being disposed perpendicular to the axis of the stem 19. The depth of the semi-spherical recess 14 in the lower half 11 of the capsule is of a magnitude such that the bore 20 of the ball 18 is in alignment with the pasageways 4 and 5 and the aperture 17. The periphery of the ball 18 is smoothly finished and this, coupled with the inherent lubricity of synthetic resin such as polytetrafluroethylene, allows the ball to be freely rotated within the capsule.

Aside from their desirable lubrication properties, synthetic resins advantageously are used also for their chemical resistivity and ability to function in a wide range of operating temperatures. However, synthetic resins of the type herein used do have a tendency to creep or cold flow, particularly when under compression. Thus, a well known problem has been the cold flow of the resin to the point where the flow of fluid through the valve is obstructed. Also there has been a tendency of the resin to flow into the bore of the ball when the valve is in the "off" position and thereby hinder or prevent further operation of the valve. Yet the flow properties of synthetic resin are desirable in that the resin will fill small voids and clearances between parts of the valve so that a leak-tight seal is attained. Thus, the problem becomes one of restraining the degree of cold flow of the resin within limits so that a tight seal is obtained, but the operation of the valve is not obstructed.

To limit the cold flow and assure proper suport for the two halves of the capsule, rings 21 are provided which are disposed in the apertures 17 of the capsule. As greatly magnified in FIG. 4, each ring 21 is formed of steel and includes a thin coat 22 of resin on the faces thereof to obviate any scratching of the ball by the ring should they contact. Referring again to FIG. 4, it may be seen that the rings 21 are spaced from both the ball 18 and the pasageways 4 and 5 with the resinous material flowing into the small spaces 23 to form a leak-tight seal. To assure that the resin will not flow into the bore 20 of the ball 18 when the valve is in the "off" position, a second set of apertures are formed in the capsule identical to the first set of apertures 17. Semi-circular recesses 24 and 25 are formed in the mating ends of the upper and lower halves 10 and 11, respectively. The second set of apertures 26 are spaced 90° from the first set so that the bore of the ball 18 will be aligned therewith when the valve is in the "off" position. Disposed in the second set of apertures are steel disks 27 having a concave face, FIG. 7, mating with the spherical surface of the ball 18. A coating of resin 28 is provided on the concave face of the disk 27. The disks 27 serve to close the bore 20 in the ball 18 in the "off" position of the valve and thereby assure that the valve will not be adversely effected by any cold flow of the resinous capsule that may occur.

In this connection it should be noted that a definite purpose is served by forming the second set of apertures identical to the first set. The capsule is designed to act as a sealing means and consequently the subject of considerable compressive forces. The identical sets of apertures divides the capsule into quadrants, thus assuring equal distribution of the compressive forces and any cold flow resulting therefrom. This is particularly critical since distortion of the capsule would destroy the close fitting relationship of the ball in the spherical cavity.

Returning to the sealing function of the capsule, the lower half 11 of the capsule is press-fitted into the lower portion of the cavity 6 with the upper half 10 mating closely with the sides of the cavity 6. By this arrangement the flow of fluid through the valve is carefully channeled and the inherent cold flow of the capsule eliminates any small void spaces that might trap the fluid. The capsule will thus provide a positive seal over the full range of pressure independent of the pressure in the system.

The sealing of the valve is completed by an adjustable package arrangement which includes a packing gland 29 having a central hole 30 through which the stem 19 passes. Circular grooves 31 are provided on the lower surface of the packing gland with the grooves 31 co-operating with the upper surface of the capsule. Threadably engaged in the bonnet portion 7 of the cavity 6 is a packing nut 32, with the threads 33 co-operating with the threads 9 to provide a means whereby the compressive force on the sealing capsule may be varied. A handle 34 having a central bore is received over the stem 19, the handle 34 including a set screw 35 which co-operates with a flat 36 on the stem 19, whereby the handle and stem are coupled together for rotation.

As best shown in FIG. 5 and FIG. 8, the handle 34 includes a lug 37 extending over an arc of 90°. Adapted to co-operate with the lug 37 is a portion 38 which consists of a raised portion on the bonnet 7 extending over an arc of 180°. The combination of the lug 37 and the raised portion 38 coact to function as a positive stop for the handle, thereby assuring that the aperture 20 in the ball 18 either will be aligned with the passages 4 and 5 or at right angles thereto.

Disposed in the handle 34 are two holes 39, with the holes extending entirely through the handle. Similar holes 40 are provided in the packing nut 32. The provision of the holes 39 and 40 constitute a novel means for adjusting the compression on the sealing capsule without removing the valve from the line, or without the necessity of disturbing the valve setting. The adjustment may be accomplished as follows. The set screw 35 is released so that the handle 34 can be raised to disengage the stops 37 and 38 and is then free to be rotated relative to the stem 19. A tool is then inserted in each of the holes 39, and the handle 34 is turned until the holes 39 are aligned with the holes 40, thus allowing the tool to drop into the holes 40. The handle 34 may then be used as a wrench in the sense that as it is turned the packing nut 32 is also turned, thereby displacing the nut 32 longitudinally in the cavity 6 and applying a compressive force to the sealing capsule. After the adjustment has been made, the tools may be removed from the holes 39 and 40, the handle returned to its initial position and the set screw 35 tightened, thus accomplishing an adjustment of the seals without removing the valve from the system or disturbing the setting of the valve. It can therefore be seen that the adjustment mechanism described applies to the resinous capsule a compressive force which causes the capsule to flow into the spaces 23 and around the circular grooves 31 of the packing gland. Also any irregularities in the surface of the cavity 6 will be filled by the flow of the resin. As the packing nut is adjusted, the more the resin flows into the void spaces to seal the fluid flow. This arrangement allows each valve to be adjusted at the factory for a particular general purpose pressure and the purchaser can very simply adjust the valves to his own particular needs.

For reason of description, the principles of the invention have been set forth in detail in connection with but a single illustrated embodiment. It is not intended that the illustrated embodiment nor the terminology employed in describing the invention be limiting inasmuch as variation in these may be made without departing from the spirit of the invention. Rather, I desire to be restricted only by the scope of the appended claims.

I claim:
1. A valve comprising a valve body having a through bore and a central chamber extending transversely of said through bore,
   a sealing capsule disposed in said chamber,
   said capsule having intersecting passages therethrough dividing the capsule into quadrants and a spherical cavity at the intersection of said passages,
   one of said passages being aligned with said through bore,
   rotatable ball means disposed in said spherical cavity,
   said ball means having a bore adapted to be aligned with said passages,
   means operably connected to said ball means for rotating the ball means, thereby to align selectively said bore of said ball with said passages,
   ring means disposed at either end of said one of said passages,
   and disk means disposed at either end of the other of said passages,
   said ring means and said disk means including concave faces adjacent to and complementary with the surface of said ball means and convex surfaces mating with the walls of said central chamber.
2. The valve of claim 1, wherein said capsule is composed of synthetic resin and the face portions of said ring means and said disk means are coated with synthetic resin.
3. The valve of claim 1, wherein said capsule is of a dimension closely fitting within said central chamber, and adjustable means disposed in said central chamber,
   said adjustable means being operable to apply a variable compressive force on said capsule.
4. The valve of claim 3, including means mounted externally of said valve body,
   said last mentioned means being selectively operably connected to said adjustable means, whereby the compressive force on said capsule may be varied without removing the valve from the fluid line.
5. A valve comprising a valve housing having a bonnet portion and a through passage,
   a central cavity extending transversely of said through passage and opening upwardly through said bonnet portion,
   flow control means including a valve having a stem extending therefrom,
   said flow control means being disposed in said cavity with said stem extending upwardly above said bonnet,
   capsule means in said cavity,
   said capsule means enclosing and rotatably supporting said ball and sealing said through passage,
   a packing gland in said cavity and abutting said capsule,
   a packing nut abutting said packing gland and being threadedly supported on said bonnet portion of said valve body,
   handle means on said stem and having a plurality of holes therethrough,
   means releasably securing said handle to said stem whereby operation of said releasable means permits rotation of said handle relative to said stem,
   a plurality of holes in said packing nut, the holes in said handle means and said packing nut being radially spaced a substantially equal distance from said stem whereby release of said releasable means permits rotation of said handle relative to said stem to align said holes and permit the insertion of an appropriate rigid tool into said aligned holes thereby to couple said handle and said packing nut for unitary rotation independent of said stem.
6. The combination of claim 5 wherein,
   said handle means includes a central aperture receiving a portion of said stem,
   upstanding stop means on the bonnet adjacent to said handle,
   depending lug means carried by said handle adapted to engage said stop means in a predetermined position of said handle thereby to limit rotation of said handle,
   The height of said upstanding stop means being substantially less than the depth of the aperture in said handle and the length of said stem portion received in said handle aperture whereby said handle may be displaced longitudinally of said stem to disengage said lug means from said upstanding stop means without removal of said stem from the aperture in said handle.
7. A valve comprising a valve housing having a bonnet portion and a through passage,
   a central cavity extending transversely of said through passage and opening upwardly through said bonnet portion,
   flow control means in said cavity and including a ball having a stem extending therefrom upwardly above said bonnet,
   sealing means surrounding said ball and co-operating with said ball to control the flow of fluid through said valve,
   a cylindrical packing nut having threads over a portion of its surface disposed in said cavity,
   thread means on the interior walls of said central cavity above said sealing means,
   the length of said thread means on said cavity wall being greater than the length of said threads on said packing nut,
   said packing nut having a plurality of holes therein,
   handle means received over said stem externally of said valve body,
   means releasably securing said handle means to said stem whereby operation of said releasable means permits rotation of said handle means relative to said stem,
   said handle means having a plurality of holes therethrough, the holes in said handle means and said packing nut being radially spaced a substantially equal distance from said stem whereby release of said releasable means and rotation of said handle relative to said stem to align said holes permits the insertion of an approprate rigid tool into said aligned holes thereby to couple said handle means and said packing nut for unitary rotation independent of said stem.

References Cited by the Examiner

UNITED STATES PATENTS

| | | | |
|---|---|---|---|
| 1,988,966 | 1/1935 | Eckhouse | 137—454.6 |
| 2,421,332 | 5/1947 | Johnson | 251—171 X |
| 2,424,210 | 7/1947 | Sutton | 251—167 |
| 2,885,179 | 5/1959 | Hartmann | 251—315 |
| 3,038,695 | 6/1962 | Wildern | 251—309 X |
| 3,041,036 | 6/1962 | McFarland | 151—171 |
| 3,072,379 | 1/1963 | Hamer | 251—171 |
| 3,100,501 | 8/1963 | Hansen et al. | 251—171 X |
| 3,133,722 | 5/1964 | McGuire et al. | 251—309 |

FOREIGN PATENTS 809,175    2/1959    Great Britain.

M. CARY NELSON, *Primary Examiner.*

LAVERNE D. GEIGER, *Examiner.*